Patented June 7, 1932

1,861,826

UNITED STATES PATENT OFFICE

LYNDON G. THOMPSON, OF OAKLAND, CALIFORNIA, ASSIGNOR, BY MESNE ASSIGNMENTS, TO AMERICAN BITUMULS COMPANY, OF SAN FRANCISCO, CALIFORNIA, A CORPORATION OF DELAWARE

AQUEOUS ASPHALT EMULSION AND METHOD OF MAKING THE SAME

No Drawing. Application filed July 11, 1928, Serial No. 292,035, and in Australia August 30, 1927.

This invention relates to the production of aqueous emulsions of bitumen or asphalt, capable of being used cold for spraying (in painting for example) or as a road binding material, and which are suitable for various other industrial uses as a substitute for melted bitumen.

One object is the production of a thin, fluid asphaltic composition containing a very small quantity of foreign substances or impurities (that is to say, of emulsifying agents, etc.); so that when the emulsion has been applied and has solidified, the deposit will be practically pure asphalt with its usual properties. The emulsion produced as hereinafter described attains this object, with the result that, not only is there a substantial economy in the use of emulsifying agents, but there is also a product that is virtually free from impurities.

Another object of the invention is to produce an aqueous asphaltic emulsion which will solidify quickly upon exposure to the air, regardless of the temperature, and which will present a glossy surface.

A further object is to produce an emulsion of the type specified which shall have the property of good penetration when used as a binder in road making, without preliminary filtration.

Another object of the invention is the production of a thin and very fluid emulsion, capable of being used through a pump under heavy pressure, without clogging.

In carrying out the invention, the following is a procedure that has been found to give good results:—

Water to an amount equal to from 40% to 60% of the final product is placed in a suitable mixing vessel, preferably provided with power driven stirrers, and is heated to near the boiling point, (say 190° F.); whereupon a small quantity of caustic soda, about 0.25% by weight of the final product, is introduced and stirred in. The temperature of the water is maintained at or near the boiling point and agitation is continued until the caustic alkali is completely dissolved; a weak alkaline solution being thus produced. The making of this solution will require but a few moments.

Meanwhile the asphalt which is to be emulsified is melted in another vessel and is brought to a temperature of about 200° F. When the alkaline solution has been prepared in the mixing vessel, as above described, melted asphalt is run slowly into the same, the stirrers being kept in continuous operation, and the high temperature—about 200° F.— being maintained.

When a small part of the total amount of the asphalt has been introduced into the mixing vessel, oleic acid, cold and in the liquid state (or equivalent emulsifying agent as specified below), is added to the solution, in quantity preferably equal to about 0.08% to 0.25% of the ultimate product by weight. The rest of the asphalt content is then introduced, the temperature of the mass being maintained at near 200° F. and the stirring being continued. This will require about five minutes at the rate at which it has been found advantageous to introduce the asphalt. It is not necessary or desirable to interrupt the inflow of the stream of asphalt while the oleic acid is being introduced.

In place of oleic acid, other similar unsaturated fatty acids may be used, as for example, fatty acids obtained from linseed oil, or those obtained from marine animal oils (such as whale oil); and, in place of caustic soda, use may be made of caustic potash, or of sodium or potassium carbonate, in quantity sufficient to impart to the solution the desired degree of alkalinity, and to saponify the fatty acid.

By following the order of procedure specified above, the emulsification of the asphalt is accomplished with a minimum quantity of the relatively expensive emulsifying agent. Moreover, it is found in practice to be essential to follow the order of mixing the ingredients of the emulsion set forth in the foregoing description; because, when the same ingredients are mixed in a different order, the resulting product is a semi-solid, spongy mass (containing some water), which product is wholly unsuited to the purposes in contemplation, and is very different, both in its physical constitution and its properties, from the thin, easily poured liquid, obtained by the method described above. Particularly it has been found essential to the obtaining of successful results that a small part at least of the asphalt be introduced into the vessel that contains the alkaline solution before the oleic acid is added thereto.

The emulsion produced as herein described is distinguished by the presence of but a very small proportion of substances other than bitumen and water, by its great fluidity, its chocolate color, its high degree of penetration, and its property of setting quickly and presenting a glossy surface.

What is claimed is:—

1. A method of producing an asphaltic emulsion in water which consists in forming a hot caustic soda solution containing less than about 1% caustic soda, adding a minor quantity of melted asphalt thereto, stirring the contents of the vessel in which the mixture is being formed, introducing a substance capable of saponifying with the caustic soda, adding the remaining and major quantity of the asphaltic content, maintaining the temperature at about 200° F., and continuing the stirring until the emulsification is completed.

2. A method of producing an aqueous asphaltic emulsion which consists in dissolving caustic alkali in a body of water in quantity approximately 40% to 50% by weight of the ultimate mass, the amount of alkali being less than one percent by weight of the entire mass, stirring and mixing the ingredients at about the boiling point of water, adding a small part of the total asphaltic content in a melted condition while continuing the stirring and maintaining the temperature, adding oleic acid in quantity less than one percent of the ultimate mass, then adding the rest of the asphaltic content in melted condition, with continued stirring and maintenance of the elevated temperature until emulsification is complete.

3. A method of producing an asphaltic emulsion which consists in heating a caustic alkaline solution containing less than 1% of alkali, adding a minor quantity of melted asphalt thereto slowly, thoroughly mixing the ingredients, adding a substance capable of saponification with the alkali and continuing the agitation, finally adding a further and major quantity of melted asphalt and stirring the mass until emulsification is complete.

4. A method of producing fluid easily pumpable emulsions of asphalt and water, comprising forming a hot alkaline solution, adding a minor part of the total asphaltic content to the heated alkaline solution, agitating the mixture, then adding a substance capable of saponifying with the alkali in said mixture, and then adding the major remaining part of the total asphaltic content to the mixture with agitation to form an emulsion.

5. A method of producing fluid easily pumpable emulsions of asphalt and water, comprising stirring a hot alkaline solution containing less than 1% of alkali, adding a minor part of the total asphaltic content in fluid form to the heated alkaline solution, agitating the mixture, then adding an unsaturated fatty acid to the mixture, and then adding the major remaining part of the total asphaltic content to the mixture with agitation to form an emulsion while maintaining the mixture at about 200° F. during said additions and agitation.

In testimony whereof I have signed this specification.

LYNDON G. THOMPSON.